United States Patent
Ozawa et al.

(10) Patent No.: US 11,014,472 B1
(45) Date of Patent: May 25, 2021

(54) VEHICLE SEAT SLIDE STRUCTURE

(71) Applicant: Adient Engineering and IP GmbH, Burscheid (DE)

(72) Inventors: Motohiko Ozawa, Kanagawa (JP); Thomas D Novitsky, Plymouth, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/827,922

(22) Filed: Mar. 24, 2020

(51) Int. Cl.
  *B60N 2/00* (2006.01)
  *B60N 2/07* (2006.01)

(52) U.S. Cl.
  CPC .................. *B60N 2/073* (2013.01)

(58) Field of Classification Search
  CPC . B60N 2/06; B60N 2/067; B60N 2/07; B60N 2/0702
  USPC ......................... 248/424, 429, 430
  See application file for complete search history.

(56) References Cited

U.S. PATENT DOCUMENTS

| | | | | |
|---|---|---|---|---|
| 6,427,962 B1 * | 8/2002 | Rohee | .................. | B60N 2/0705 248/424 |
| 8,029,063 B2 * | 10/2011 | Kazyak | ................ | B60N 2/0806 297/344.1 |
| 8,079,759 B2 * | 12/2011 | Rohee | .................. | B60N 2/0705 384/34 |
| 8,714,509 B2 * | 5/2014 | Hayashi | ............... | B60N 2/0887 248/429 |
| 9,393,882 B2 * | 7/2016 | Masuda | ............... | B60N 2/0705 |
| 2014/0353454 A1 * | 12/2014 | Yamada | ............... | B60N 2/0818 248/430 |
| 2017/0334316 A1 * | 11/2017 | Laumeier | ............... | F16C 29/048 |

FOREIGN PATENT DOCUMENTS

JP          2012030638 A    2/2012

* cited by examiner

*Primary Examiner* — Steven M Marsh
(74) *Attorney, Agent, or Firm* — Marshall & Melhorn, LLC

(57) ABSTRACT

A vehicle seat slide structure has a movable rail, a fixed rail supporting the movable rail, a slider interposed between the rails, a reinforcing plate fixed to the fixed rail and having a threaded hole having a female thread part, and a pin having a shaft portion, a neck portion, and a head portion. The fixed rail has a first through hole concentric with the threaded hole and having an inner diameter larger than a root diameter of the female thread part. The slider has a second through hole concentric with the first through hole and having an inner diameter larger than that of the first through hole. The shaft portion is inserted through the first through hole and has the male thread part screwed in the female thread part. The head portion supports a periphery part of the second through hole between the head portion and the fixed rail.

2 Claims, 6 Drawing Sheets

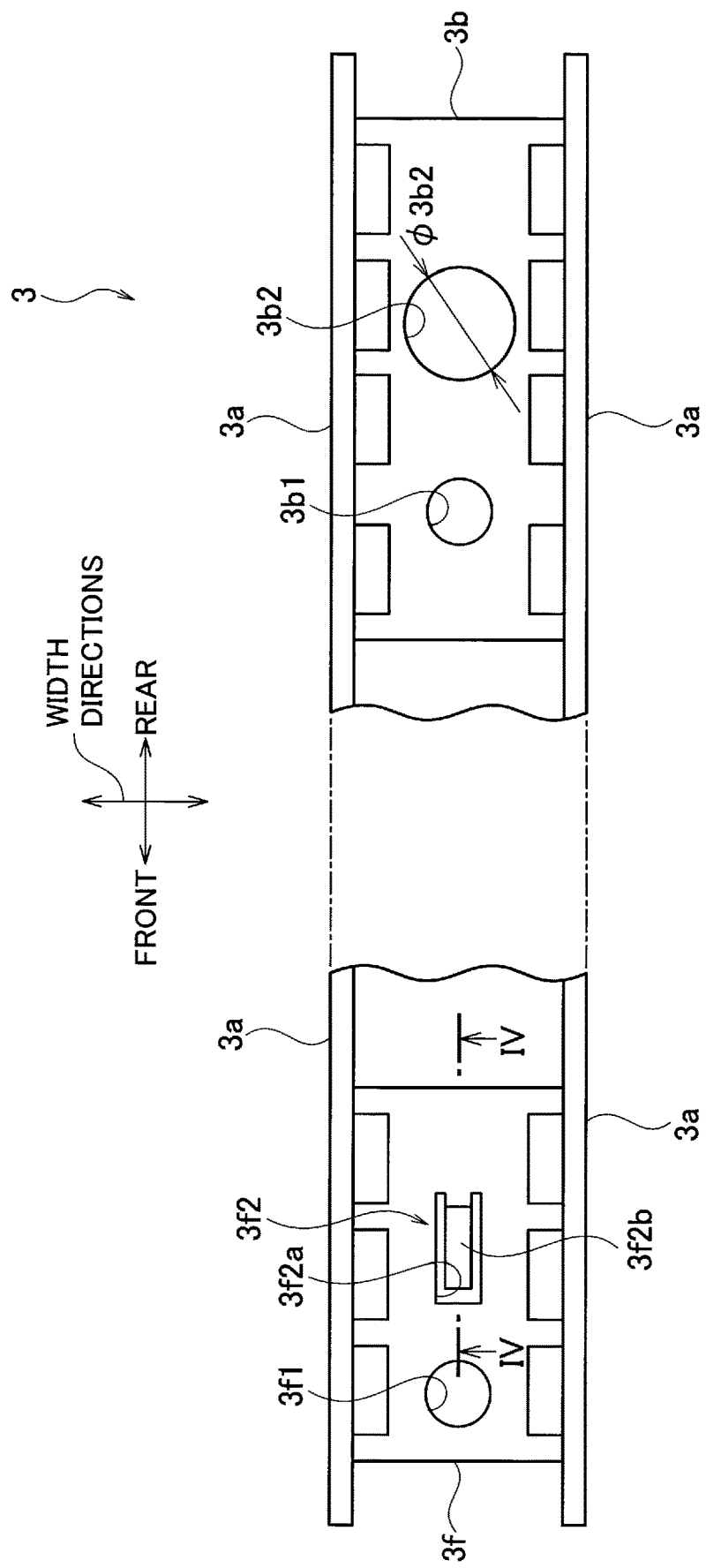

VEHICLE SEAT SLIDE STRUCTURE

FIELD OF THE INVENTION

The present invention relates to a vehicle seat slide structure, and more particularly, to a vehicle seat slide structure having a fixed rail, a movable rail slidable by engaging with the fixed rail, and a slider interposed between the fixed rail and the movable rail to allow the movable rail to slide smoothly.

BACKGROUND OF THE INVENTION

Seat slide structures to slide a vehicle seat in the longitudinal direction of a vehicle body typically include a fixed rail fixed to the floor of the vehicle body, and a movable rail fixed to the lower part of a seat cushion and movable back and forth by engaging with and supported by the fixed rail.

Japanese Patent Application Publication No. 2012-030638 discloses an example of this configuration.

A fixed rail has a locating pin protruding downward. After being positioned by the locating pin to the floor of a vehicle body, the fixed rail is fixed through fixing members arranged apart from each other back and forth.

At a position avoiding the fixing members on the bottom surface of the fixed rail, a reinforcing plate is fastened by rivets. The reinforcing plate is attached for increasing mainly bending strength and rigidity so that the fixed rail withstands the high loads transmitted thereto as a seatback falls forward at front collision and does not float off the floor.

The reinforcing plate in the slide structure is thus preferably attached to the fixed rail at the end, especially at the rear end.

SUMMARY OF THE INVENTION

A seat slide structure also has a slider made of resin or the like interposed between the fixed rail and the movable rail to allow the seat to slide smoothly.

The slider is formed generally as a ladder-shaped resin member extending slightly shorter than the fixed rail, for example.

The slider has multiple hooks protruding downward at the front and rear ends. The slider is arranged along the inner surface of the fixed rail and attached to the fixed rail by having multiple hooks hooked to bottom holes on the front and rear ends of the fixed rail.

Since the slider is made of elongated resin, positions of the hooks hooked to the fixed rail are preferably at the front and rear ends.

However, especially the rear end position is also preferable for the reinforcing plate to be attached, and thus the hooks may interfere with the reinforcing plate.

To avoid such interference between the hooks and the reinforcing plate, a notch has to be provided in the conventional reinforcing plate to release the hooks protruding downward from the bottom surface holes of the fixed rail on the assumption that the strength would be reduced.

Accordingly, a device that enables the slider to be attached to the fixed rail while maintaining the strength of the reinforcing plate as much as possible is awaited for slide structures.

An object of the present invention is to provide a vehicle seat slide structure to attach a slider to a fixed rail while maintaining the strength of a reinforcing plate.

A vehicle seat slide structure according to one aspect of the present invention includes a movable rail fixed to a frame of a vehicle seat, a fixed rail fixed to a vehicle body, the fixed rail engaging with and supporting the movable rail so as to allow the movable rail to move linearly, a slider interposed between the movable rail and the fixed rail, a reinforcing plate integrally fixed to a bottom surface of the fixed rail, the reinforcing plate having a threaded hole formed therein, the threaded hole having a female thread part with its axis extending in a thickness direction of the reinforcing plate and a pin comprising a shaft portion having a male thread part, a neck portion formed on a first end of the shaft portion, and a head portion formed on the neck portion, wherein the fixed rail has a first through hole formed therein, the first through hole being concentric with the threaded hole and having an inner diameter larger than a root diameter of the female thread part, the slider has a second through hole formed therein, the second through hole being concentric with the first through hole and having an inner diameter larger than the inner diameter of the first through hole, the head portion has an outer diameter larger than the inner diameter of the second through hole, the shaft portion is inserted through the first through hole and has the male thread part screwed in the female thread part, the neck portion is positioned in the second through hole to press the fixed rail, and the head portion holds a periphery part of the second through hole between the head portion and the fixed rail.

In accordance with an embodiment of the present invention, the slider is attached to the fixed rail while the strength of the reinforcing plate is maintained.

BRIEF DESCRIPTION OF THE DRAWINGS

FIG. 3 is a partial top view of a slider 3 included in the slide structure SK.

DETAILED DESCRIPTION OF THE INVENTION

Figure 1:
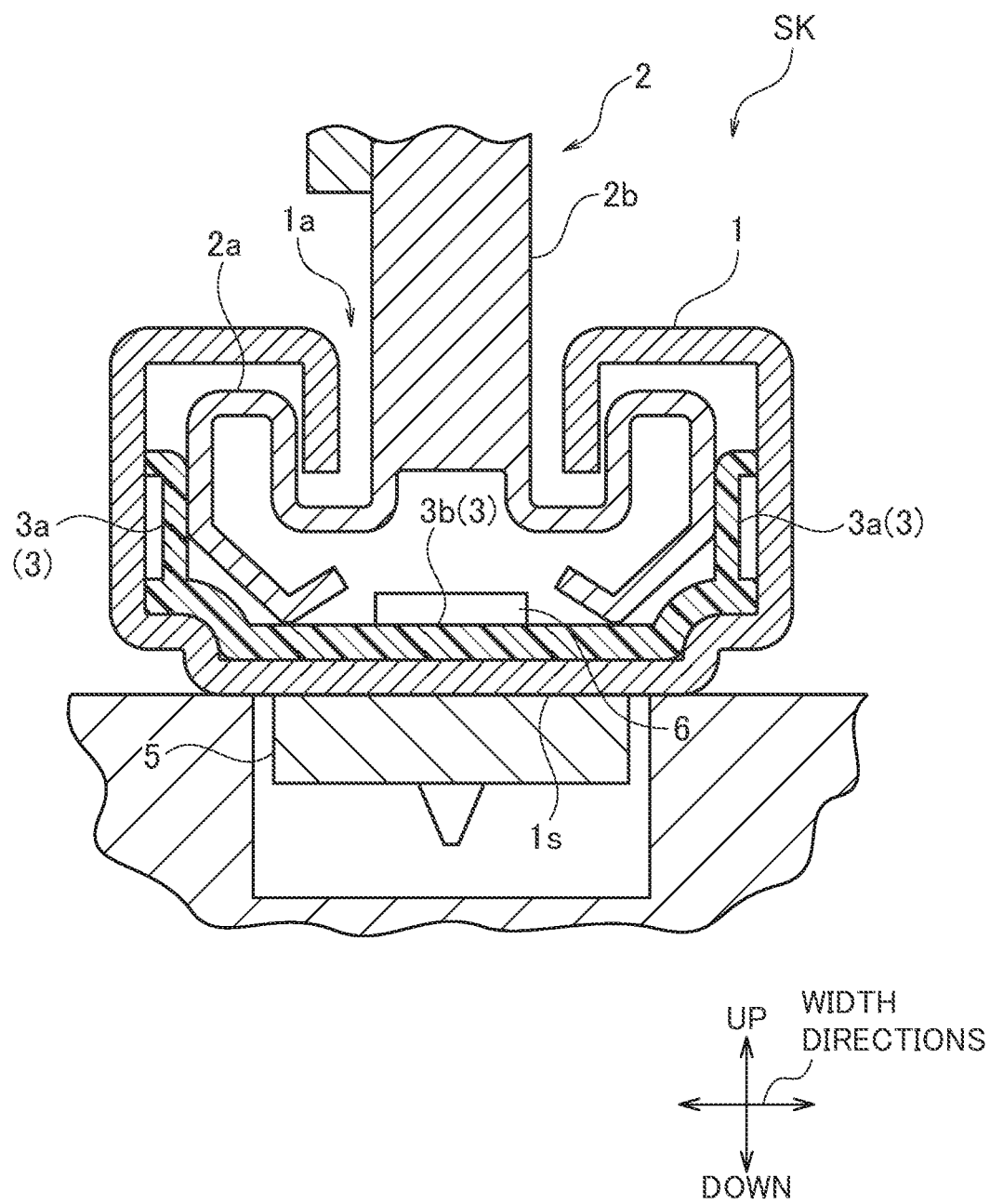
FIG. 1 is a cross-sectional view of a slide structure SK taken along line I-I of FIG. 5 as an example of a vehicle seat slide structure according to an embodiment of the present invention.

A slide structure SK as an example of a vehicle seat slide structure according to an embodiment of the present invention is explained with reference to FIGS. 1 to 6. In the following description, respective directions of up, down, front, and rear, and width directions corresponding to directions of left and right are defined by arrows in the drawings as up, down, front, and rear directions, and width directions of a vehicle body on which a seat is mounted.

Figure 5:
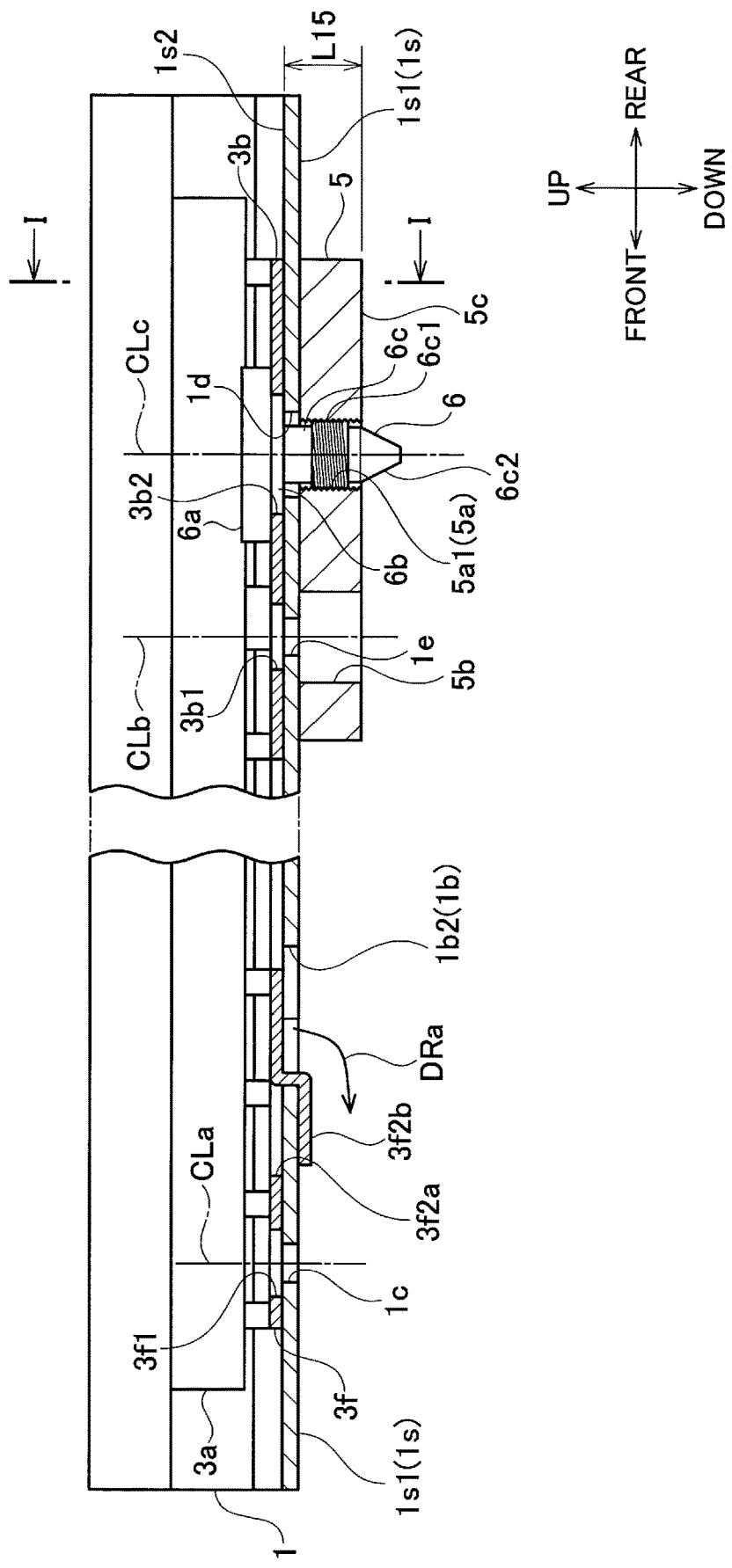
FIG. 5 is a longitudinal sectional view of the fixed rail 1 with the slider 3 attached thereto.

FIG. 1 is a cross-sectional view of the slide structure SK, in which a fixed rail 1 with a reinforcing plate 5 attached thereto, a movable rail 2 engaging with and supported by the fixed rail 1, and a slider 3 are cut along the line I-I of FIG. 5 on a rear connection portion 3b (refer to FIG. 3) of the slider 3.

As shown in FIG. 1, the fixed rail 1 generally has a rectangular frame-shaped section with an opening part 1*a* on the upper side. The fixed rail 1 is a pushing member extending in the front and rear directions perpendicular to the sheet of FIG. 1.

The fixed rail 1 is to be fixed to the floor of the vehicle body through a not-shown fixing member.

The movable rail 2 includes a base part 2*a* movable back and forth by engaging with and supported within the fixed rail 1, and a seat support part 2*b* extending upward from the base part 2*a* to protrude from the fixed rail 1 through the opening part 1*a*. A not-shown side frame of a vehicle seat is fixed to the upper part of the seat support part 2*b*.

As described above, since the movable rail 2 is linearly movable in the front and rear directions with respect to the fixed rail 1 fixed to the floor, the vehicle seat is movable in the front and rear directions with respect to the floor of the vehicle body.

The fixed rail 1 and the movable rail 2 have a slider 3 made of resin interposed therebetween. The slider 3 enables the movable rail 2 to move more smoothly in the front and rear directions with respect to the fixed rail 1.

Figure 2A:
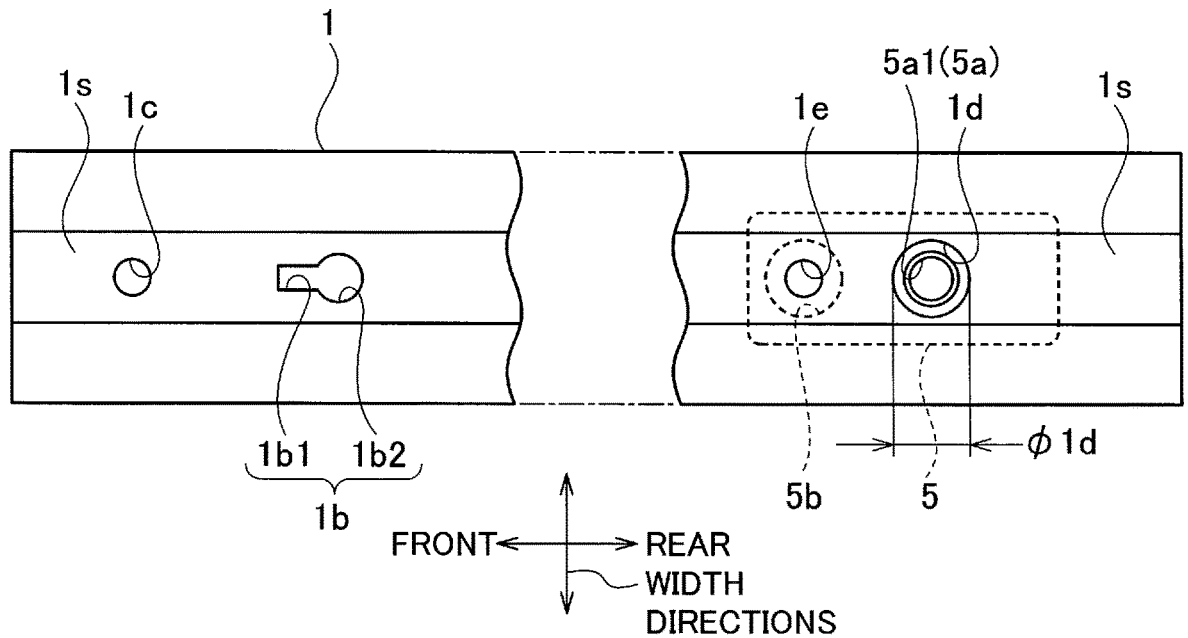
FIG. 2A is a partial top view of a fixed rail 1 included in the slide structure SK.
Figure 2B:
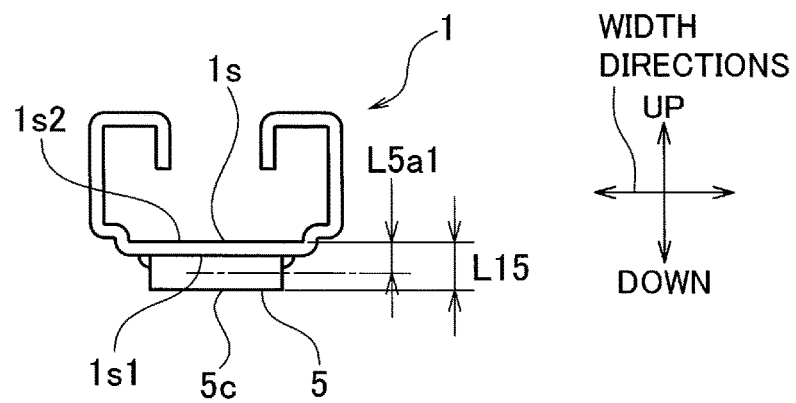
FIG. 2B is a rear side view of the fixed rail 1.
Figure 2C:
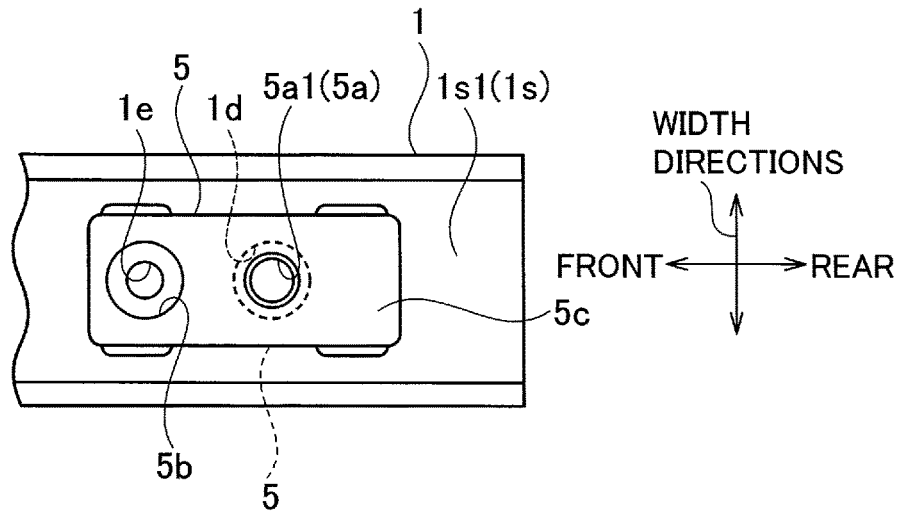
FIG. 2C is a partial bottom view of the fixed rail 1.

FIG. 2A is a top view of the fixed rail 1, in which the middle part in the longitudinal direction is partially not shown for simplification. FIG. 2B is a rear side view of the fixed rail 1. FIG. 2C is a partial bottom view of the rear end part of the fixed rail 1.

The fixed rail 1 includes a bottom wall 1*s*. The front part of the bottom wall 1*s* is provided with a through hole 1*c* and an engagement hole 1*b* separated from each other back and forth. The engagement hole 1*b* has a square hole 1*b*1 extending back and forth, and a round hole 1*b*2 communicating with the rear part of the square hole 1*b*1.

The rear part of the bottom wall 1*s* is provided with a through hole 1*e* and a through hole 1*d* separated from each other back and forth. Here, the inner diameter of the through hole 1*d* is an inner diameter $\phi 1d$.

The bottom wall 1*s* of the fixed rail 1 includes a bottom surface 1*s*1 to which the reinforcing plate 5 is integrally fixed by welding. The reinforcing plate 5 is generally a rectangular parallelepiped elongated back and forth.

The reinforcing plate 5 has a threaded hole 5*a* formed therein. The threaded hole 5*a* is concentric with the through hole 1*d* (centered around an axial line CLc extending in the up and down directions) and includes a female thread part 5*a*1. The female thread part 5*a*1 has its axis extending in a thickness direction of the reinforcing plate 5. The inner diameter $\phi 1d$ of the through hole 1*d* is formed larger than a root diameter of the female thread part 5*a*1.

Moreover, the reinforcing plate 5 has a through hole 5*b* formed therein. The through hole 5*b* is concentric with the through hole 1*e* and larger in diameter than the through hole 1*e*. Here, the distance in the up and down directions between a top surface 1*s*2 of the bottom wall 1*s* of the fixed rail 1 and a bottom surface 5*c* of the reinforcing plate 5 is a distance L15.

Next, the slider 3 is described with reference to FIGS. 1 to 3. FIG. 3 is a top view of the slider 3, in which the middle part in a longitudinal direction is partially not shown for simplification, and the front and rear parts are shown.

The slider 3 includes a pair of side portions 3*a*, 3*a* extending in the front and rear directions at the both ends in the width directions, a front connection portion 3*f* connecting the pair of side portions 3*a*, 3*a* in the width directions at least at the front end part of the slider 3, and the rear connection portion 3*b* connecting the pair of side portions 3*a*, 3*a* in the width directions at least at the rear end part of the slider 3. The pair of side portions 3*a*, 3*a* extends in the up and down directions in a section perpendicular to the front and rear directions.

The front connection portion 3*f* and the rear connection portion 3*b* are portions to be arranged on the top surface 1*s*2 of the bottom wall 1*s* of the fixed rail 1. The slider 3 is made of resin, for example.

The front connection portion 3*f* includes a through hole 3*f*1 and a hook part 3*f*2 provided apart from each other back and forth.

Figure 4:
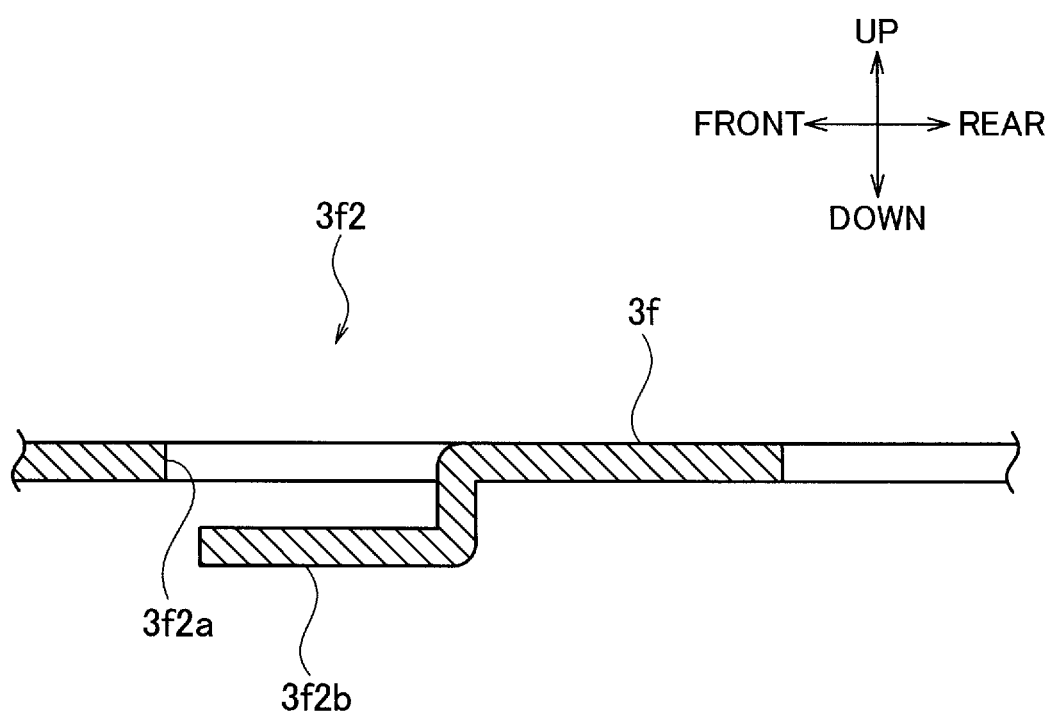
FIG. 4 is a sectional view of a front connection portion 3f of the slider taken along line IV-IV of FIG. 3.

As shown in FIG. 4, which is a sectional view of the hook part 3*f*2 taken along the line IV-IV of FIG. 3, the hook part 3*f*2 includes a through hole 3*f*2*a* extending in the front and rear directions and a hook 3*f*2*b* in a two-step bending shape that bends downward from the rear end of the through hole 3*f*2*a* and further extends forward from the end.

The through hole 3*f*1 has an inner diameter slightly larger than that of the through hole 1*c* of the fixed rail 1.

The hook 3*f*2*b* is formed to be engageable with the engagement hole 1*b* of the fixed rail 1. Details will be described later.

The rear connection portion 3*b* includes a through hole 3*b*1 and a through hole 3*b*2 formed apart from each other back and forth.

The pitch between the through hole 3*b*1 and the through hole 3*b*2 in the front and rear directions is the same as that of the through hole 1*e* and the through hole 1*d* of the fixed rail 1 in the front and rear directions. The inner diameter of the through hole 3*b*1 is made larger than that of the through hole 1*e*, and the inner diameter of the through hole 3*b*2 is made larger than that of the through hole 1*d*. Regarding an inner diameter $\phi 3b2$ of the through hole 3*b*2, the inner diameter $\phi 1d$ < the inner diameter $\phi 3b2$.

The slider 3 is attached to the fixed rail 1 by a structure described below with reference to FIGS. 5 and 6.

FIG. 5 is a longitudinal sectional view of the fixed rail 1 with the slider 3 attached thereto. FIG. 6 is a half sectional view of a pin 6 that is a locating pin with a thread used for the attachment.

As shown in FIG. 5, in the attachment of the slider 3 to the fixed rail 1, the hook 3*f*2*b* of the slider 3 is passed through the engagement hole 1*b* of the fixed rail 1 from above to below and moved forward to be hooked (refer to an arrow DRa).

As a result, the front connection portion 3*f* of the slider 3 is held in substantially close contact with the top surface 1*s*2 of the fixed rail 1.

The slider 3 is positioned with respect to the fixed rail 1 in the front and rear directions by hitting the hook 3*f*2*b* against the front end part of the square hole 1*b*.

In particular, the through holes 3*f*1, 3*b*1, 3*b*2 of the slider 3 are concentric with the through holes 1*c*, 1*e*, 1*d* of the fixed rail 1 around axial lines CLa, CLb, CLc extending in the up and down directions, respectively.

Next, the rear connection portion 3*b* of the slider 3 is fastened to the fixed rail 1 by the pin 6. Details of the pin 6 is described with reference to FIG. 6.

Figure 6:
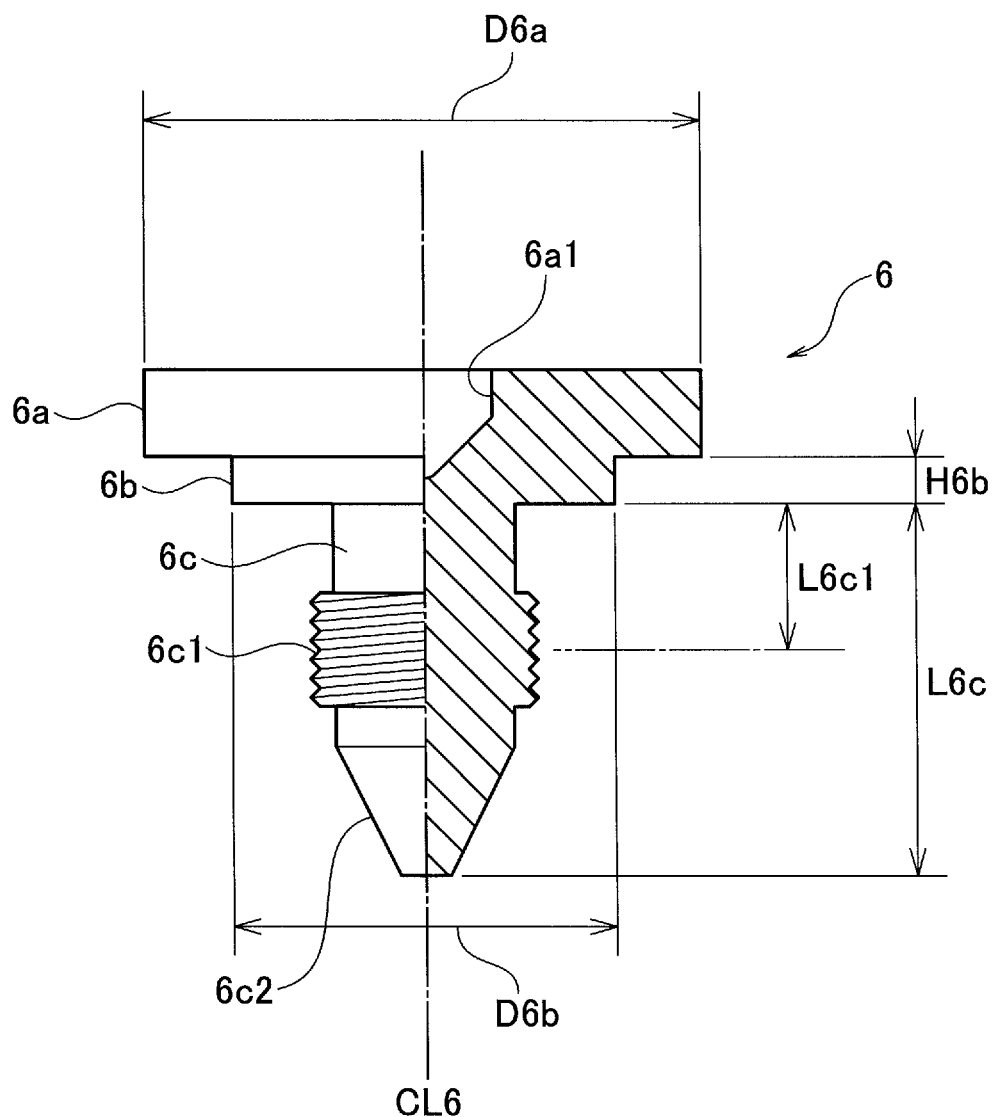
FIG. 6 is a half sectional view of a pin 6 used to attach the slider 3 to the fixed rail 1.

As shown in FIG. 6, the pin 6 includes a head portion 6*a*, a neck portion 6*b*, and a shaft portion 6*c*. The head portion 6*a* has a disc shape with a diameter D6*a*. The neck portion 6*b* has a disc shape, is centered around an axial line CL6 of the head portion 6*a*, and protrudes from the head portion 6*a* with a diameter D6*b* smaller than the diameter D6*a* of the head portion 6*a*. The shaft portion 6*c* extends from the neck portion 6*b* on the axial line CL6.

The head portion 6*a* has a hexagonal hole 6*a*1 formed thereon so that the pin 6 is turned with a tool.

The neck portion 6b has a thickness H6b that is the axial length. The thickness H6b is the same as or slightly smaller than the thickness of the rear connection portion 3b of the slider 3.

The shaft portion 6c includes a male thread part 6c1 forming a male thread on the middle part in the axial direction, and a guide part 6c2 tapering toward the end thereof.

The male thread part 6c1 is screwable into the female thread part 5a1 of the reinforcing plate 5.

The shaft portion 6c has a length L6c that is the axial length and is sufficiently longer than the distance L15 in FIG. 2B.

Moreover, the shaft portion 6c has a distance L6c1 that is the distance between the root position of the shaft portion 6c and the middle position of the male thread part 6c1 in the axial direction. The distance L6c1 is set the same as or approximate to a distance L5a1 in FIG. 2B between the top surface 1s2 of the fixed rail 1 and the middle position of the female thread part Sal of the reinforcing plate 5 in the up and down directions.

Return to FIG. 5. The shaft portion 6c of the pin 6 is inserted from above in the through hole 1d of the fixed rail 1, the through hole 1d being seen through the through hole 3b2 of the slider 3 positioned on the fixed rail 1.

With this insertion, the male thread part 6c1 is ready to be screwed into the female thread part Sal. The pin 6 is tightened so that the male thread part 6c1 is screwed into the female thread part 5a1 and the neck portion 6b presses the bottom wall 1s.

As a result, the neck portion 6b is positioned in the through hole 3b2 of the slider 3, and the head portion 6a holds the top surface of the periphery of the through hole 3b2 of the slider 3.

The rear connection portion 3b of the slider 3 is thus fixed and held between the pin 6 and the fixed rail 1.

With the pin 6 screwed into the female thread part 5a1, the guide part 6c2 protrudes downward from the bottom surface 5c of the reinforcing plate 5 having an amount enough for positioning and thus functions as a locating pin.

The fixed rail 1 with the slider 3 attached as described above is attached by bolts or the like to a body side member through an attachment member using the through holes 1c and 1e corresponding to the axial lines CLa and CLb. In the attachment, the positioning with respect to the body side member is performed by the pin 6 as the locating pin.

As described above, the slider 3 has the front connection portion 3f hooked to the bottom wall is of the fixed rail 1 by the hook 3f2b, and the rear connection portion 3b fastened by the pin 6 as the locating pin to the reinforcing plate 5 unified with the bottom wall 1s. The slider 3 is thus attached to the fixed rail 1. In other words, the slide structure SK gives the pin 6 that is also the locating pin the function to fix the slider 3 so as to attach the slider 3 to the fixed rail 1.

Therefore, at least the reinforcing plate 5 attached to the rear part of the fixed rail 1 has no need of having the hook release shape, which reduces the strength.

The slider 3 is thus attached to the fixed rail 1 while maintaining the strength of the reinforcing plate 5.

The present invention is not to be limited to the embodiment explained above, and can be modified variously within a range of not digressing from the essence of the present invention.

The fixed rail 1, the movable rail 2, and the slider 3 in cross-sectional shapes are not limited to those shown in FIG. 1 and may have various cross-sectional shapes.

The connection portion to be attached to the fixed rail 1 by the pin 6 is not limited to the above described one provided on the rear part of the slider 3 and may be applied to one on the middle part or on the front part in the front and rear directions.

Moreover, the point at which the slider 3 is attached to the fixed rail 1 by the pin 6 is not limited to one. When the slider 3 is attached at multiple points by pins 6, a single pin 6 working as a locating pin is enough, and the second and subsequent pins 6 may have the shaft portion 6c shorter in length not to protrude from the bottom surface 5c of the reinforcing plate 5.

The invention claimed is:

1. A vehicle seat slide structure, comprising:
a movable rail fixed to a frame of a vehicle seat;
a fixed rail fixed to a vehicle body, the fixed rail engaging with and supporting the movable rail so as to allow the movable rail to move linearly;
a slider interposed between the movable rail and the fixed rail;
a reinforcing plate integrally fixed to a bottom surface of the fixed rail, the reinforcing plate having a threaded hole formed therein, the threaded hole having a female thread part with its axis extending in a thickness direction of the reinforcing plate; and
a pin comprising a shaft portion having a male thread part, a neck portion formed on a first end of the shaft portion, and a head portion formed on the neck portion, wherein
the fixed rail has a first through hole formed therein, the first through hole being concentric with the threaded hole and having an inner diameter larger than a root diameter of the female thread part,
the slider has a second through hole formed therein, the second through hole being concentric with the first through hole and having an inner diameter larger than the inner diameter of the first through hole,
the head portion has an outer diameter larger than the inner diameter of the second through hole,
the shaft portion is inserted through the first through hole and has the male thread part screwed in the female thread part,
the neck portion is positioned in the second through hole to press the fixed rail, and
the head portion holds a periphery part of the second through hole between the head portion and the fixed rail.

2. The vehicle seat slide structure as described in claim 1, wherein
the pin has a second end of the shaft portion protruding downward from a bottom surface of the reinforcing plate.

* * * * *